United States Patent [19]

Yokomizo

[11] Patent Number: 4,567,527
[45] Date of Patent: Jan. 28, 1986

[54] IMAGE READING APPARATUS

[75] Inventor: Yoshikazu Yokomizo, Kawagoe, Japan

[73] Assignee: Canon Kabushiki Kaisha, Tokyo, Japan

[21] Appl. No.: 672,160

[22] Filed: Nov. 16, 1984

Related U.S. Application Data

[63] Continuation of Ser. No. 197,637, Oct. 16, 1980, abandoned.

[30] Foreign Application Priority Data

Oct. 20, 1979 [JP] Japan .................................. 54-135442

[51] Int. Cl.[4] ............................................. H04N 1/40
[52] U.S. Cl. .................................... 358/282; 358/213; 358/221; 250/206
[58] Field of Search ............... 358/280, 282, 284, 213, 358/221, 222; 250/200, 201, 206, 578

[56] References Cited

U.S. PATENT DOCUMENTS

| | | | |
|---|---|---|---|
| 3,845,242 | 10/1974 | Richeson, Jr. et al. | 358/264 |
| 4,001,502 | 1/1977 | van Roossel | 358/221 |
| 4,217,608 | 8/1980 | MacGregor et al. | 358/212 |
| 4,225,883 | 9/1980 | Van Atta et al. | 358/213 |
| 4,293,877 | 10/1981 | Tsunekawa et al. | 358/213 |

OTHER PUBLICATIONS

Jeremiah M. Morgan, "Automatic Black Level Hold for Television Camera Amplifier", RCA Technical Notes, No. 257, Jun. 1959.

Primary Examiner—Edward L. Coles, Sr.
Attorney, Agent, or Firm—Fitzpatrick, Cella, Harper & Scinto

[57] ABSTRACT

An image reading device, comprising a circuit for adding a correction voltage to the output voltage of a solid-state imaging device and a circuit for maintaining the correction voltage so as to obtain a video signal of a constant voltage level for a given image density.

6 Claims, 4 Drawing Figures

IMAGE READING APPARATUS

This application is a continuation of application Ser. No. 197,637 filed Oct. 16, 1980, now abandoned.

BACKGROUND OF THE INVENTION

1. Field of the Invention

The present invention relates to an image reading apparatus for obtaining a video signal from an image by means of a solid-state imaging device.

2. Description of the Prior Art

Conventionally, the output signal level from a solid-state imaging device such as a charge coupled device (CCD) is subject to variations, even for a determined light intensity, due to an increase in dark current resulting from an increase in the ambient temperature, a gain regulation in the video amplifying circuit and fluctuations between imaging devices.

SUMMARY OF THE INVENTION

An object of the present invention is to provide an image reading apparatus capable of compensating for such variations in the output signal level. The above-mentioned object is achieved by adding a correction voltage to the output voltage of the solid-state imaging device and maintaining correction voltage so as to obtain a video signal of a constant output voltage level for a given image density.

DESCRIPTION OF THE PREFERRED EMBODIMENTS

Figure 1:
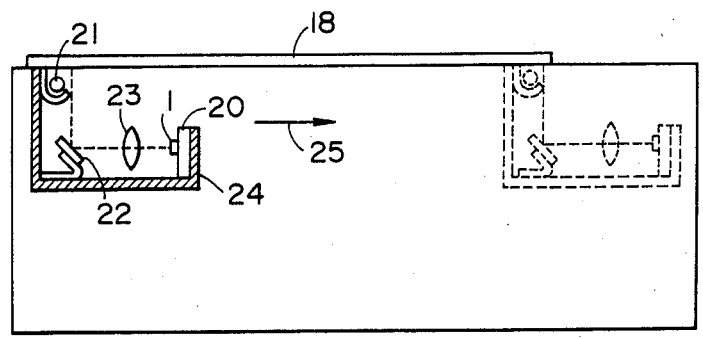
FIG. 1 is a schematic cross-sectional view of an image reading apparatus embodying the present invention.

FIG. 1 shows, in a schematic cross-sectional view, an image reading apparatus embodying the present invention, wherein there are shown a CCD 1, a transparent plate 18 for supporting an original, a mount 20 for supporting said CCD, an original illuminating lamp 21, a mirror 22 for deflecting the light reflected by the original to said CCD 1, and an optical lens 23 for focusing an image of said original on said CCD 1. Said CCD 1, lamp 21, mirror 22 and lens 23 are mounted on a support frame 24 which is displaceable in the direction of arrow 25 to scan the original placed on the transparent plate 18.

Figure 2:
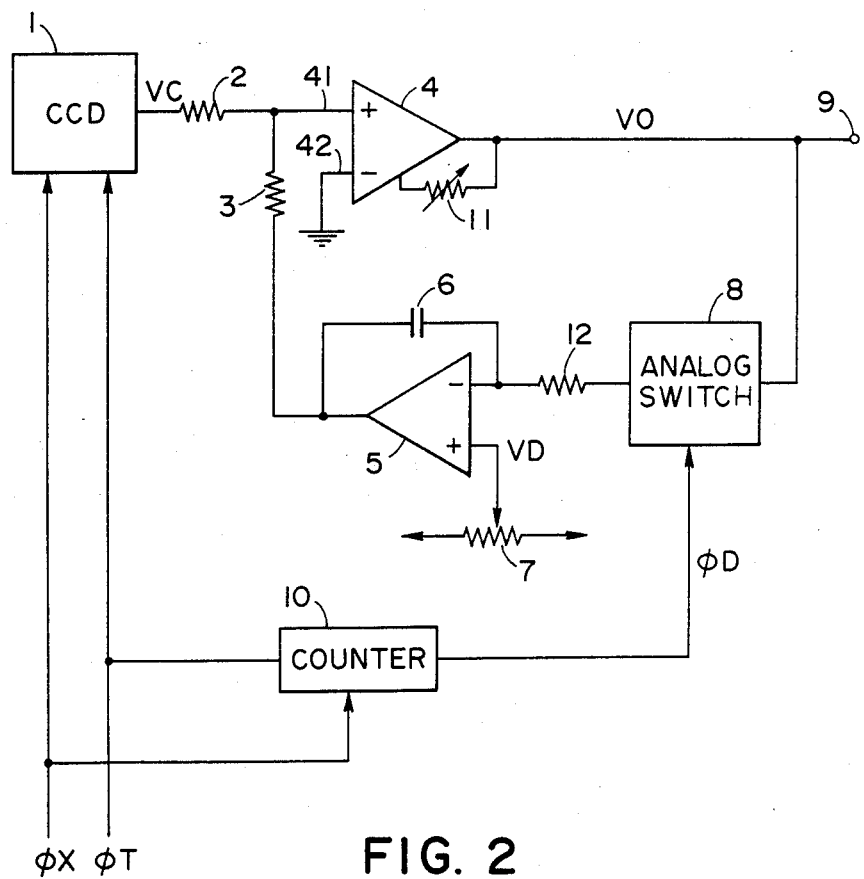
FIG. 2 is a block diagram of a circuit embodying the present invention.

Reference is now made to FIG. 2 showing, in a block diagram, an embodiment of a circuit for compensating for the variations in the output signal level from the CCD 1, wherein an output signal VC from said CCD 1 is supplied through a resistor 2 to the non-inverting input terminal 41 of a video amplifier 4 composed of an operational amplifier, the inverting input terminal 42 of which is grounded. A variable resistor 11 is provided for regulating the gain of said amplifier 4. The output signal VO from said video amplifier 4 is supplied to an output terminal 9, and is also supplied, through an analog switch 8 and a resistor 12, to an integrating circuit composed of an operational amplifier 5 and an integrating capacitor 6. A variable resistor 7 is provided for adjusting the black level. The output from said operational amplifier 5 in said integrating circuit is supplied through a resistor 3 to the non-inverting input terminal of said video amplifier 4, whereby said analog switch 8 and said integrating circuit connected parallel to said video amplifier 4 constitute an addition circuit for providing a correction voltage to the output signal from CCD 1.

A counter circuit 10 generates, from the clock pulses $\phi T$ for driving CCD 1 and from the reset pulses $\phi X$, sampling pulses $\phi D$ synchronized in time with the black level to be stabilized in the video signal, said sampling pulses $\phi D$ being utilized for on-off control of the analog switch 8.

In the above-explained circuit, the counter circuit 10, after being reset by a reset pulse $\phi X$, initiates counting of the clock pulses $\phi T$ and generates a sampling pulses $\phi D$ at a time corresponding to a black level, thereby activating the analog switch 8 and closing the feedback loop for black level stabilization. Thus the output signal VO of the video amplifier 4 is introduced through the analog switch 8 and resistor 12 to the integrating circuit to initiate integration. The video signal VO is compared with a target black level signal VD obtained from the variable resistor 7, and, if the signal VO is lower, the integrated output from the operational amplifier 5 continues to increase until VO becomes equal to VD. When VO becomes equal to VD, the operational amplifier 5 releases a constant output because of the zero differential input, whereby the signal VO is clamped at the level of VD.

During the absence of the sampling pulse $\phi D$ from the counter 10 to the analog switch 8, the integrating capacitor 6 maintains the above-mentioned correction voltage to stabilize the signal VO at the level of VD, and said correction voltage is added to the output signal supplied from CCD 1 through the resistor 2 to obtain a corrected analog video signal from the terminal 9. The black level of said video signal is equal to VD because of the above-mentioned stabilization.

Figure 3:
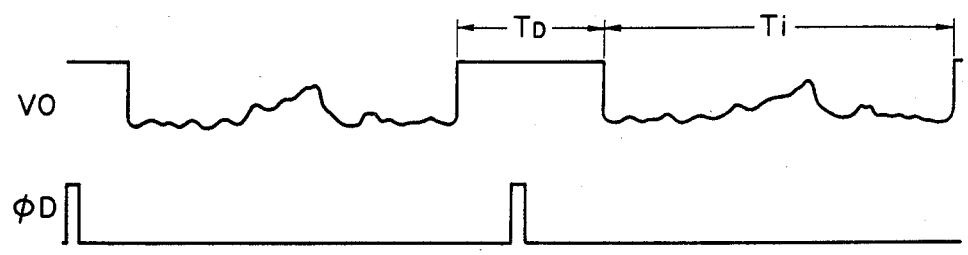
FIG. 3 is a chart showing the relation between a video signal VO and sampling pulses $\phi D$.

FIG. 3 shows the relation between the video signal VO and the sampling pulse $\phi D$. The video signal is not affected by the black level sampling as such sampling is conducted during the absence of the video signal.

Figure 4:
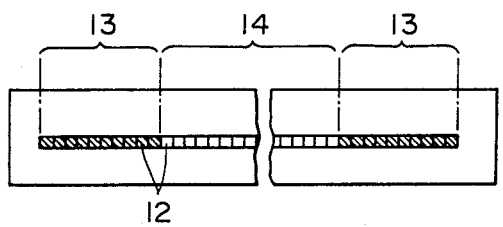
FIG. 4 is a plan view of a linear charge-coupled device.

FIG. 4 shows a plan view of a linear or two-dimensional CCD 1 having photoreceptor cells 12, which are divided into non-image areas 13 with masked cells and an image area 14 for receiving the imaging light for example from an original.

As the cells in the non-image areas 13 are always masked from the incoming light, there is generated a black level signal in each scanning and during the video signal period.

The periods $T_D$ and $T_i$ in FIG. 3 respectively correspond to the signal output from the non-image areas 13 and the signal output from the image area 14.

As explained in the foregoing, the present invention stabilizes the video signal level from a solid-state imaging device by adding a correction voltage to the output voltage from the solid-state imaging device by the aforementioned adding circuit so as to obtain a video signal of a constant voltage level for a determined image density and maintains a correction voltage in the correcting capacitor during the signal output from the aforementioned image area. Also in the foregoing embodiment the video signal is not affected since the sampling is conducted in the non-image area of the solid-state imaging device. Also it is rendered possible to constantly stabilize the video signal as the correction is made in each scanning.

Although the foregoing explanation has been directed to the use of the two-dimensional CCD, the present invention is naturally applicable to a three-dimensional or area CCD or to other solid-state imaging devices such as a bucket brigade device BBD.

What I claim is:

1. An image reading apparatus, comprising:
   means for generating clock pulses;
   a solid-state imaging device connected to be driven by clock pulses, generated by said generating means, to read an original image and to produce an output representative thereof, said imaging device including a linear array of photoreceptor cells;
   means for amplifying the output of said imaging device;
   a feedback circuit for correcting the output of said imaging device, said feedback circuit including means for comparing the output of said amplifying means, when said imaging device is driven to read a reference image density, with a predetermined reference value and for producing a correction signal in accordance with the comparison, and means for applying a signal correction to said output of said imaging device at the input of said amplifying means in accordance with said correction signal;
   means for counting said clock pulses generated by said generating means;
   switching means provided in said feedback circuit and connected to said counting means to operate at a timing determined by counting of said pulses by said counting means to close said feedback circuit for the production of said correction signal when said imaging device reads said reference image density; and
   means for retaining said signal correction for a predetermined time.

2. An image reading apparatus according to claim 1, wherein said retaining means is operative to retain said correction signal while the original image is read out for one line.

3. An image reading apparatus according to claim 1, wherein said imaging device is operable to read an original in a predetermined image area and wherein said switching means is controlled to close said feedback circuit when the imaging device reads said reference image density outside said image area and to open said feedback circuit when the imaging device reads the original image in said image area.

4. An image reading apparatus according to claim 1, further comprising means for adjusting said reference value.

5. An image reading apparatus according to claim 1, wherein said solid-state imaging device comprises an array of photo-receptor cells, said array being divided into an image area for receiving said original image and a non-image area that in use will not receive said original image.

6. An image reading apparatus according to claim 5, further comprising a masking member for masking a non-image area of said imaging device from irradiation during reading of original image.

* * * * *

UNITED STATES PATENT AND TRADEMARK OFFICE
CERTIFICATE OF CORRECTION

PATENT NO. : 4,567,527
DATED : January 28, 1986
INVENTOR(S) : YOSHIKAZU YOKOMIZO It is certified that error appears in the above-identified patent and that said Letters Patent is hereby corrected as shown below:

Column 1, line 27, change "maintaining correction" to --maintaining the correction--.

Signed and Sealed this

Twenty-sixth Day of August 1986

[SEAL]

Attest:

DONALD J. QUIGG

Attesting Officer

Commissioner of Patents and Trademarks